June 2, 1942.   E. J. W. RAGSDALE   2,285,171
PASSENGER RAILWAY ROLLING STOCK
Original Filed April 7, 1937
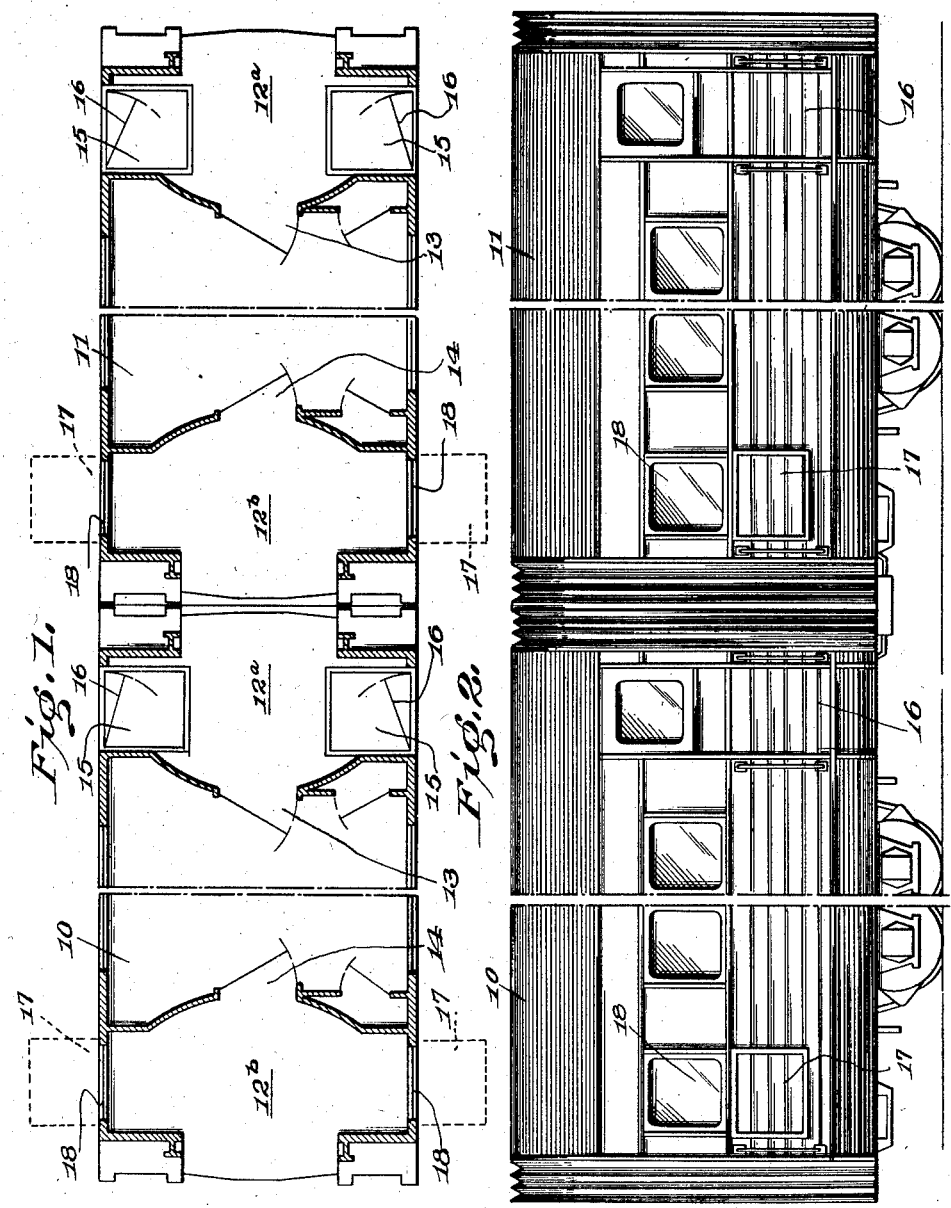
INVENTOR
EARL J.W. RAGSDALE
BY
ATTORNEY Patented June 2, 1942

2,285,171

UNITED STATES PATENT OFFICE 2,285,171

PASSENGER RAILWAY ROLLING STOCK

Earl J. W. Ragsdale, Norristown, Pa., assignor to Edward G. Budd Manufacturing Company, Philadelphia, Pa., a corporation of Pennsylvania Substituted for abandoned application Serial No. 135,451, April 7, 1937. This application February 24, 1940, Serial No. 320,528

4 Claims. (Cl. 105—8)

This application is a substitute for application Serial No. 135,451, filed April 7, 1937, for Vestibule.

The invention relates to railway rolling stock, and particularly to passenger cars or trains of passenger cars.

It is a principal object of the invention to provide an arrangement in such cars or trains of cars whereby the passengers and their baggage may be handled more expeditiously and with greater comfort to the passengers both in the loading and unloading of a car or train of cars.

According to the usual arrangement in such cars or trains of cars, both the baggage and the passengers were loaded and unloaded through the vestibule compartment at the ends of the cars and a door opening therefrom to the outside. This has resulted in congestion in both loading and unloading. Particularly, in unloading it was customary to pile the baggage in the vestibule, thus blocking the aisles for passage from one car to the other, and making it necessary for the porter to first clear the vestibule of baggage before the discharge of passengers could commence.

According to the invention this inconvenience is entirely avoided because the flow of passengers and baggage is kept separate, without, however, widely separating the passenger from his baggage, by providing a baggage compartment adjacent a vestibule on the same or the adjacent car of a train of cars, this baggage compartment having an opening to the outside of a height sufficient only to readily permit of the passage of baggage therethrough to and from the baggage compartment.

In a preferred form the baggage compartment is arranged in place of the usual vestibule compartment at one end of a car or a train of similar cars having a baggage compartment at one end and a passenger discharge vestibule at the other end. This places the baggage compartment opening in close adjacency to the vestibule at the adjacent end of the next car and enables the porter stationed just between the vestibule opening into which the passengers enter and the baggage compartment opening to relieve the passengers of their baggage as they enter and transfer it at once, in the sight of the entering passengers, to the baggage compartment. Similarly, in the unloading, the passengers can begin to leave through the vestibule and its associated side door as soon as the train comes to a stop, and the porter can hand them their baggage taken from the baggage discharge opening as they leave. Thus, by this arrangement the entry and exit of the passengers is greatly expedited and with no discomfort to the passengers, and the aisles leading from car to car are at all times unobstructed by the baggage of the passengers thus permitting them to pass freely from one car to another without hindrance ordinarily to the piling up of baggage in the vestibules when the train comes into the station.

Whether incorporated in a single car or in a train of cars, the main object of the invention is achieved by providing a baggage compartment with a door for entrance and discharge of baggage in such adjacency to the next available passenger entrance and exit vestibule that the baggage flow does not interfere with the passenger flow and whereby a porter standing between the baggage and passenger openings can promptly relieve the passengers on entering of their baggage and transfer it in the baggage compartment and vice versa on leaving of the passengers.

Further objects and advantages of my invention will appear from the following description of a preferred form of embodiment thereof taken in connection with the attached drawing in which:

Fig. 1 is a partial floor plan of two adjacent passenger cars with intermediate parts of the cars eliminated.

Fig. 2 is a partial side elevation of the coupled ends of the two cars partially shown in Fig. 1.

It is well known that trains which make but few stops and carry passengers with considerable baggage such as long distance or through trains are often very much delayed at the stops due to the inconvenience and difficulty in discharging the passengers and baggage. Not only is it inconvenient and objectionable to have the passengers exit out of the same doorway through which the baggage is discharged, but it is often inconvenient to have the passenger discharge platform piled high with luggage which either delays the passengers or makes it dangerous for them to hurdle it. Furthermore, the entering passengers must wait until all the baggage is discharged and all the passengers discharged before they can enter with their bags. On the other hand, passengers dislike having their baggage out of their sight and prefer to have it discharged near them.

The two rail cars 10 and 11, in accordance with one form of embodiment of my invention, are adapted to be coupled together in the usual train arrangement and they each have a vestibule portion 12a and 12b which is closed off by the doorways 13 and 14 from the interior of the car body. One end of the rail car 10 having the vestibule portion 12a is provided with the usual passenger entrance and exit step wells 15 and doors 16 on each side of the car body. From this part of the vestibule, therefore, the passengers discharge in the usual manner.

The adjacent end of the car body 11 having the vestibule portion 12b has no step wells, although it is at the usual high loading level. It has a doorway 17 the bottom of which is substantially at the vestibule level and below the window 18 as shown in Fig. 2. The doorway 17 is preferably hinged at the bottom and opens outwardly to form a platform as shown in dotted lines in Fig. 1, such platform being substantially flush with the vestibule.

The porters in discharging the passengers from car 10 will place their baggage in the adjacent vestibule portion 12b of the car 11 adjacent door 17 and when the train stops the baggage door will be let down and the baggage drawn out by the porters. At the same time, the passengers in car 10 will discharge out of the vestibule portion 12a of car 10 in full sight at all times of their baggage. In this way, rapid discharge is effected as there is no interference between passengers and baggage. In the same manner, the passengers and baggage from car 11 are conveniently discharged from the vestibule common to car 11 and the next adjacent car, so that there is always a separated flow of people and baggage. It is, of course, to be understood that if there were but a few passengers, those from cars 10 and 11 could be discharged at the common vestibule between the cars. Such a vestibule has a far greater capacity as the baggage door opens out and baggage may be piled directly against it.

Present types of trains might be modified in accordance with this invention by swinging the lower half of the usual passenger exit door outwardly, although this would be somewhat complicated and it might be difficult to obtain a rigid structure with a downwardly and outwardly opening door. New equipment can be readily made with the improved construction, however, and some economies effected in structural cost.

While I have shown a preferred form of embodiment of my invention, it will be understood that modifications may be made thereto and that I therefore desire to include within such protection, those modifications which reasonably come within the scope and spirit of the disclosure herein and of the claims appended hereinafter.

What is claimed is:

1. A passenger rail car having a full width vestibule for passengers at one end, a full width baggage compartment and of small longitudinal extent as compared with the overall length of the car at the other end and a passenger compartment extending the entire length between the vestibule and baggage compartment, said passenger vestibule having a full height door, a step well and a trap door therefor in a side wall thereof for the entrance and exit of passengers and said baggage compartment having a full width fixed floor at the floor level of the passenger compartment and having further an opening in its side wall, the bottom of said opening being substantially at the floor level of the baggage compartment, said opening serving as a baggage entrance and discharge opening.

2. A passenger railroad train in which adjoining passenger accommodating cars are each provided with a full width vestibule for passengers, and a baggage compartment of vestibule proportions whose longitudinal extent is small as compared with the overall length of the car, the remainder of the space within the car comprising passenger-accommodation space, the order of succession of said spaces in the individual cars and the relative arrangement of the cars in the train being such that vestibule and baggage spaces adjoin each other, and the passenger accommodation spaces of the train are arranged between successive sets of such adjoining spaces, each said passenger vestibule having a full height door, a stepwell and a trap door therefor in the side walls of its car for the entrance and exit of passengers, and each said baggage compartment having a full width fixed floor at the floor level of the adjoining passenger space, and having a further opening in its side wall, the bottom of said opening being substantially at the floor level of the baggage compartment, said opening serving as baggage entrance and discharge opening.

3. A passenger rail car according to claim 2 in which the opening for the baggage compartment is provided with a door hinged at the bottom of the opening and arranged to swing outwardly to form a platform substantially at the level of the floor of the baggage compartment.

4. A passenger rail car according to claim 2 in which the baggage compartment has a window opening in its side wall of substantially the full height of the windows of the passenger compartment, and the baggage entrance and discharge opening is arranged below said window opening.

EARL J. W. RAGSDALE.